CHEMICAL PLATING

Filed Dec. 21, 1964 2 Sheets-Sheet 1

INVENTORS
RICHARD S. MCGRATH
NORMAN W. SILCOX

BY

ATTORNEY

April 23, 1968 R. S. McGRATH ETAL 3,379,539

CHEMICAL PLATING

Filed Dec. 21, 1964 2 Sheets-Sheet 2

United States Patent Office 3,379,539
Patented Apr. 23, 1968

3,379,539
CHEMICAL PLATING

Richard S. McGrath, Hopewell Junction, and Norman W. Silcox, Poughkeepsie, N.Y., assignors to International Business Machines Corporation, New York, N.Y., a corporation of New York Filed Dec. 21, 1964, Ser. No. 419,669
11 Claims. (Cl. 106—1)

ABSTRACT OF THE DISCLOSURE

A process and plating bath for electrolessly plating a nickel-iron magnetic material comprising nickel ions, ferrous ions, hypophosphite ions, hydroxyl ions and ferric ions.

This invention relates to magnetic thin films, and, in particular, to an improved process for electrolessly forming magnetic thin films, for adaptation as storage and switching elements in data processing and computer machines.

Ever since M. J. Blois, Jr. described, in The Journal of Applied Physics, vol. 26, p. 975, 1955, the preparation of magnetic thin films of 80:20 (by weight) nickel-iron in the presence of an orienting field, which field is used to induce uniaxial anisotropy, both the academic community and industry have initiated concerted efforts to develop these magnetic thin films as practical storage and switching devices for computers. These magnetic thin films provide two stable states along the preferred direction of magnetization corresponding to positive and negative remanence. Upon the application of selected electrical signals, along conductors, in contact with, or in the vicinity of, the films, the magnetization is switched from one remanent state to the other to represent intelligence. The polarity of magnetic remanence corresponds to specific bits of intelligence and is recognizable upon interrogation with the application of further selected electrical signals, for the retrieval of the stored information. What has captured the interest of the scientific community is that the rotational switching mode, by which the remanence switches in thin films, is a considerably faster mechanism than the wall-motion switching of ferrite cores. That magnetic thin film offers opportunities for increasing the speed and reliability of computers is easily seen.

Although, in general, it is recognized that the Permalloy type of material, that is, compositions containing from 15% to 45% iron and 55% to 85% nickel, offer promising films for these applications, and conventional techniques such as vacuum deposition, electroplating, cathode sputtering and pyrolytic reactions are available for fabricating such films, much yet awaits development before a magnetic thin film is produced from one of these techniques, which is adaptable for use in the data processing or computer machine and which is both scientifically and commercially competitive with ferrite cores.

One process which has overcome many of these heretofore mentioned difficulties is that of chemical reduction or electroless plating. Such a process is the subject of copending application of Arnold F. Schmeckenbecher, Ser. No. 353,849, filed Mar. 23, 1964, and assigned to the assignee of the instant application. As brought out in that patent application, nickel, nickel-cobalt and other metal alloy films have been deposited on active or catalytic surfaces by the reduction of the metal salts with hypophosphite, but few advances have been made in the reduction of nickel-iron films where the major constituent of the film is nickel, until the advent of the Schmeckenbecher patent application. In the prior art, in those instances where the nickel-iron films were deposited electrolessly, the resulting films were disturb-sensitive and exhibited a low one to zero difference signal. The former property, disturb-sensitivity, is a measure of the ability of a film to remain in a selected remanent state in the presence of stray fields; the more disturb-sensitive a film is, the more precisely must the switching fields conform to specified magnitudes and directions. The latter quantity, the one to zero difference signal, is a measure of the signal available for sensing intelligence on interrogation; the lower that signal is, the more difficult it becomes to accurately discriminate between noise signals and intelligence, and, the greater are the demands placed on the sensing circuits.

In the heretofore mentioned patent application of Arnold F. Schmeckenbecher, it is indicated that these aforementioned problems are overcome with the chemical reduction of a nickel-iron film with an electroless solution where the hypophosphite ion concentration is maintained below 7.00 grams/liter. As brought out there, while the reasons for the success in the deposition are not well understood, a working hypothesis has been advanced. It is believed that in the electroless solution containing 7.00 grams/liter of hypophosphite ions or less, the plating rate is slower than with higher concentrations of hypophosphite, allowing for more interaction and growth of secondary ingredients, which favor high resistivity and in turn discourage eddy current formation, thereby providing more complete switching of that film. Further, that patent application indicates that it has been found necessary to maintain the pH of at least 8, in the electroless solution, for the deposition of magnetic thin films which are suitable for computer application. What has been found with solutions having a pH lower than this is that very little iron is deposited in the films, however large the amount of the iron in the solution, and that optimum results are achieved when the pH is maintained at 10 or above. Within these limits of hypophospite concentration and pH, magnetic thin films are obtained which provide improvements over the films produced by other available techniques in the prior art.

What has now been discovered is that even further improvements are available, with the electroless plating solution process, by incorporating into the electroless solution selected amounts of ferric ions. That addition of ferric ions, it has been observed, further increases the one to zero difference signal, further decreases disturb-sensitivity, provides a more uniform crystallite grain size, furnishes more consistent device characteristics, all of which results in greater speed and increased reliability.

Accordingly, it is a primary object of this invention to provide an improved chemical reduction process for electrolessly depositing magnetic thin films suitable for computer application.

It is yet another object of this invention to provide an improved process for producing magnetic storage and switching elements having enhanced magnetic properties.

It is still another object of this invention to provide an electroless solution for chemically depositing magnetic thin films with improved magnetic properties.

It is still a further object of this invention to provide an economical and commercially feasible chemical reduction process for producing magnetic thin films with reproducibility and uniformity of characteristics.

These and other objects are accomplished with a new and improved electroless plating solution that contains an alkaline aqueous solution of nickel and ferrous ions, up to about 7 grams/liter hypophosphite ions, up to about 850 parts per million of ferric ions, and with the pH maintained at at least 8. The process is based on the controlled autocatalytic reduction of the nickel and iron by means of the hypophosphite anions. New nickel-iron-phosphorous alloys are chemically deposited from the electroless solution by placing into contact therewith substrates which are composed of copper, nickel, cobalt, iron, steel, aluminum, zinc, palladium, platinum, brass, manganese, chromium, molybdenum, tungsten, titanium, tin, silver, carbon or graphite or alloys containing combinations thereof. The catalytic properties of these materials, which are inherent or activated, brings about a reduction of the nickel and iron to the nickel-iron-phosphorous alloys by the hypophosphite anions present. Of course, it will be realized by those versed in the art, that non-catalytic surfaces, such as non-metallic materials, are amenable to the treatment, after the surface of the non-catalytic material is sensitized or activated by producing a film of one of a catalytic material on the surface thereof. This is accomplished by a variety of techniques known to those skilled in the art.

When performing electroless plating of nickel and iron in an alkaline solution, the presence of a compound forming water soluble nickel complexes is necessary in order to prevent precipitation of the nickel as a hydroxide or hypophosphite. This is avoided with the addition of sufficient ammonia or ammonia salts to form the nickel hexamine complex ion. To prevent the precipitation of the iron as ferrous ions, tartrate ions are added to keep the concentration or the ferrous ions below their solubility limit. Similarly, the activity of the hypophosphite ion is regulated by adjusting the free alkali content as measured by the hydroxyl ion content of the solution, this being done with the addition of sodium hydroxide, ammonium hydroxide, and other bases.

It will be recognized by those versed in the art that other complexing or sequestering agents besides the ammonia and tartrate ions are usable in the solution of this invention. These include organic complex forming agents containing one or more of the following functional groups; primary amino group ($-NH_2$), secondary amino group ($>NH$), tertiary amino group ($>N-$), imino group ($=NH$), carboxy group ($-COOH$), and hydroxy group ($-OH$). The preferred agents are Rochelle salt, Seignette salt, tartaric acid, ammonia, ammonium hydroxide, and ammonium chloride. Related polyamines and N-carboxymethyl derivatives thereof may also be used. Cyanides may not be employed since the plating process will not function in their presence. The nickel and iron are added in the form of any water soluble salt, the criterion being that the salt is not antagonistic to the plating solution. The cations are furnished in the form of chlorides, sulfates, acetates, sulfanates and mixtures thereof.

In carrying out the electroless plating process, the article to be plated, that is, the catalytic material, is properly prepared by mechanical cleaning and degreasing according to the standard practice of the industry. If the material to be plated consists of copper or a copper alloy, the article is then further cleaned by dipping in 10% hydrochloric acid for about 30 seconds in room temperature, then activated by dipping in a 0.1% palladium chloride solution for about 15 seconds and at room temperature. Due to an exchange reaction $$Metal^0+Pd^{++}=Metal^{++}+Pd^0$$

some palladium is deposited on the catalytic surface. It acts as a catalyst to initiate the reduction of nickel and iron by the hypophosphite.

In the heretofore mentioned patent application of Arnold F. Schmeckenbecher, the activated catalytic material, following the above treatment, is immersed in the plating solution, which has been heated to the required temperature, and thereafter is covered with a layer of xylene. The xylene blanket, or equivalents thereof, was used to prevent the oxidation of the ferrous ion to the ferric ion and to retard the evaporation of ammonia. It was believed that ferric ions were detrimental to the desired effect, if present in concentrations of more than a few parts per million. It is now found that selected additions of ferric ions, up to about 800 parts per million, are most advantageous and contribute greatly to further enhancement of the required characteristics for magnetic thin film storage or switching devices.

In the formation of the magnetic thin film, the catalytic surface is exposed to the electroless plating solution for a sufficient period of time to develop a nickel-iron-phosphorous alloy on the surface thereof. To enhance the development of anisotropic properties, that is, magnetic characteristics that exhibit directional preferences over the surface of the film the electroless plating is conducted in the presence of a magnetic field. Isotropic properties, that is, magnetic properties that are the same in every direction along the surface of the film, are also available with the electroless plating technique, in accordance with the invention, but as those versed in the art will recognize, the external field is not required.

The magnetic thin films, produced from the electroless deposition process, exhibit unique characteristics which are most desirable for adaptation for computer and data processing machines. The magnetic thin films contain from about 15% to 35% iron, about 65% to about 85% by weight nickel, and about 0.25% to about 2% by weight phosphorous, with it being preferred to have a magnetic thin film that contains from about 28% to 30% by weight iron, and about 70% to 72% by weight nickel. These magnetic thin films appear silver-metallic with small dark dots visible under the microscope. At higher thicknesses, they turn from golden brown to dark brown. They are face-centered cubic structures, and their surface corrugated. Electron microscopes at 40,000× show an agglomeration of balls with their diameter in the order of 1000 Angstroms. Films in thicknesses of about 20,000 Angstroms, when exposed to driving fields, switch their magnetization within relatively short periods of time. Switching speeds in the order of 2 to 6 nanoseconds ($1\times10^{-9}$ seconds) under applied fields of 20 oersteds are realized. Large one to zero signals, low disturb-sensitivity, uniformity of resultant product, and improved enhanced magnetic characteristics are the attributes of this electroless plating process.

The foregoing and other objects, features and advantages of the invention will be apparent from the following more particular description of the preferred embodiment of the invention as illustrated in the accompanying drawings.

Figure 1:
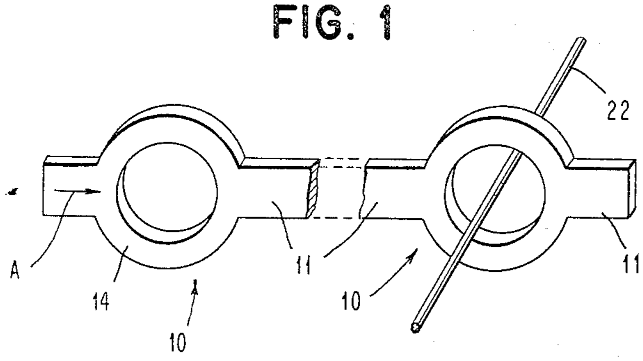
FIGURE 1 is an isometric diagram of the substrate utilized in the deposition of the magnetic thin film in accordance with the invention.

Now, more particularly as to the formation of the magnetic film on a storage element by the novel solution and process of this invention, reference is made to FIGURE 1 which shows a conductive strip in the form of a chain-like configuration on the surface of which the magnetic film of this invention is deposited. FIGURE 1 shows several elements 10 of the chain-like configuration prior to undergoing the magnetic deposition. The conductive strip element 10 includes torodial or elliptically shaped portions 14 which are electrically coupled by neck portions 11. The toroidal or elliptically shaped portions 14 form the storage unit. The conductive strip storage device is described more fully in U.S. patent application Ser. No. 332,588 to Hans-Otto G. Leilich and in U.S. patent application Ser. No. 332,746 to John L. Anderson et al., both of which are assigned to the assignee of the instant invention. Of course, it will be recognized that, although only two storage units are shown in the chain-like configuration, it will be understood that many such units may form part of one chain-like substrate.

In forming the substrate, that is, conductive strip 10, two ounce (.0028 inch in thickness) rolled copper foil is preferred, although, as heretofore mentioned, any catalytic surface is usable. The copper foil is cleaned in a 10% solution of hydrochloric acid, rinsed with water, and dried. Conventional photoresist is applied, and the material is then exposed with positive art work, to xenon arc lamp or equivalent light source, for a few seconds. The material is then etched in 30° Bé. ferric chloride, immersed in photographic fixer and the required chain-like structure developed according to standard techniques.

Following this, the chain-like structure is again rinsed in hydrochloric acid, washed in water, then it is dipped for about 15 seconds at room temperature into a solution of 1 gram of purified palladium chloride in a mixture of 1000 milliliters of water and 1 milliliter of concentrated hydrochloric acid for sensitizing. Following this, the chain-like structure is again rinsed with water.

Figure 2:
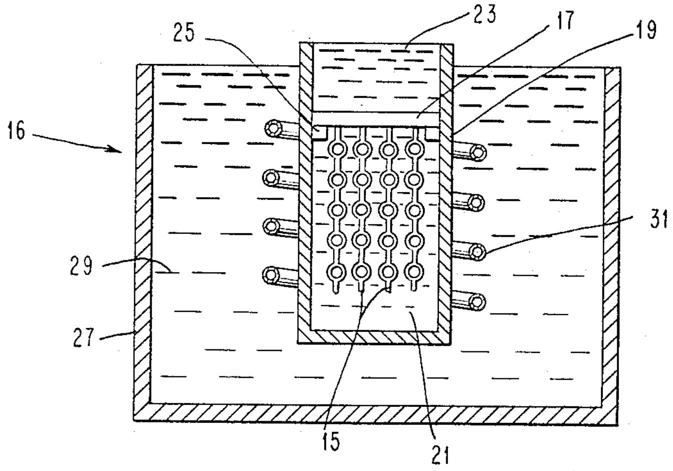
FIGURE 2 is a cross-sectional view of the apparatus used in the deposition of the magnetic film in accordance with the invention.

The chain-like substrate is then ready for deposition of the magnetic film. This is done in an apparatus, generally depicted as numeral 16, and illustrated in FIGURE 2. A series of conductive strips 15 are mounted along rack 17 and inserted into container 19, which container 19 holds the required electroless solution 21. This is then covered with a layer of xylene 23. As heretofore discussed, it was previously thought that the xylene covering was required to inhibit the oxidation of the iron cations in the electroless solution. Now, as found, the addition of ferric ions is most beneficial and advantageous, when the quantity of ferric ions incorporated into the solution is maintained within the proportions as hereinbefore and hereafter taught. Rack 17 is mounted within container 19, on supports 25, positioned along the sides of the container 19, and container 19 then inserted into vat 27 which includes liquid medium 29, such as water or oil, for maintaining a constant bath temperature. FIGURE 2 shows container 19 enclosed by cylindrical coil 31 which is activated for enhancing anisotropic characteristics in the resulting film. As previously indicated, electroless plating of a substrate is conducted, without an applied magnetic field, where isotropic properties are sought.

The composition of the electroless solution, in accordance with this invention, contains the ingredients, in the concentrations, as shown in the following chart. Of course, it is to be realized that the examples to follow are given by way of illustration and explanation, and not intended in any way to limit the inventive contribution to the particular specific examples. It is to be noted that the chart includes as complexing agents ammonia, ammonium, and tartaric salts. It is also to be noted that other complexing agents are usable, as hereafter discussed. The chart presents the concentration in grams/liter of aqueous solution of each ion constituent present in the solution. In each instance, the minimum, optimum and maximum concentrations for each compound salt and ion constituent is given in tabular form.

| | Min. | Preferred | Max. |
|---|---|---|---|
| Electroless Solution: | | | |
| Nickel ions $Ni^{++}$, Grams/Liter | 0.3 | 3.30 | 30 |
| Ferrous ions $Fe^{++}$, Grams/Liter | 0.1 | 1.1 | 10 |
| Ferric ions $Fe^{+++}$, p.p.m. | 200 | 500 | 850 |
| Hypophosphite ions $(H_2PO_2)$, Grams/Liter | 2.00 | 3.5 | 7.0 |
| Tartrate ions $(C_4H_4O_6)$?, Grams/Liter | 5 | 17.5 | 80 |
| Nickel to ferrous ion ratio $Ni^{++}/Fe^{++}$, Grams/Liter | 1.00 | 3.0 | 5 |
| pH | 8 | 10.5 | 13 |
| Ammonium ions, Grams/Liter | 0.6 | 64 | 300 |
| Temperature, ° C | 50 | 75 | 95 |
| Time, min | 5 | 45 | 120 |
| Plating rate, A./min | 150 | 500 | 1,500 |

As indicated above, the preferred ratio of nickel to ferrous ions is approximately 3:1; the hypophosphite ions preferably maintained at about 3.5 grams/liter; the ferric ion addition maintained at about 500 parts per million; and the pH maintained at about 10.5 to develop the optimum characteristics available from the electroless solution.

In order to demonstrate the process of the present invention, a further example is provided hereafter.

Once the copper substrate is prepared for acceptance of an electroless magnetic thin film deposit, as heretofore discussed, the copper chain-like member is immersed in an electroless solution containing:

TABLE I

| Compound: | | |
|---|---|---|
| $NiCl_2 \cdot 6H_2O$ | grams/liter | 266.0 |
| $NaH_2PO_2 \cdot H_2O$ | do | 277.0 |
| $NaKC_4H_4O_6 \cdot 4H_2O$ | do | 600.0 |
| $NH_4OH$ (28–30% $NH_3$, specific gravity 0.9) | milliliters/liter | 230 |
| $Fe(NH_4)_2(SO_4)_2 \cdot 6H_2O$ | grams/liter | 7.78 |
| Temperature | ° C | 75 |
| pH | | 10.5 |

As ions, this bath contains

TABLE II

| | Grams/liter |
|---|---|
| $Ni^{++}$ | 3.3 |
| $Fe^{++}$ | 1.1 |
| $Fe^{+++}$ | 0.50 |
| $(H_2PO_2)^=$ | 3.4 |
| $(C_4H_4O_6)^=$ | 20.8 |
| (OH) | 31.6 |

The pH of the electroless solution of Table I and Table II is maintained at about 11.5 and the ratio of nickel to ferrous ions at about 3:1. The solution is poured into a container covered with about ½ inch thick layer of xylene and heated, by suitable means, to a bath temperature of about 75° C. The activated substrates, hanging from the rack, are positioned in the solution for about 40 minutes. Both anisotropic and isotropic magnetic films are prepared in separate runs. In the case where anisotropic films are made, a homogeneous linear magnetic field of about 40 oersteds is applied along the longitudinal axis of the substrate. Following the electroless deposition treatment, the substrates are removed, rinsed with water and dried.

Figure 3:
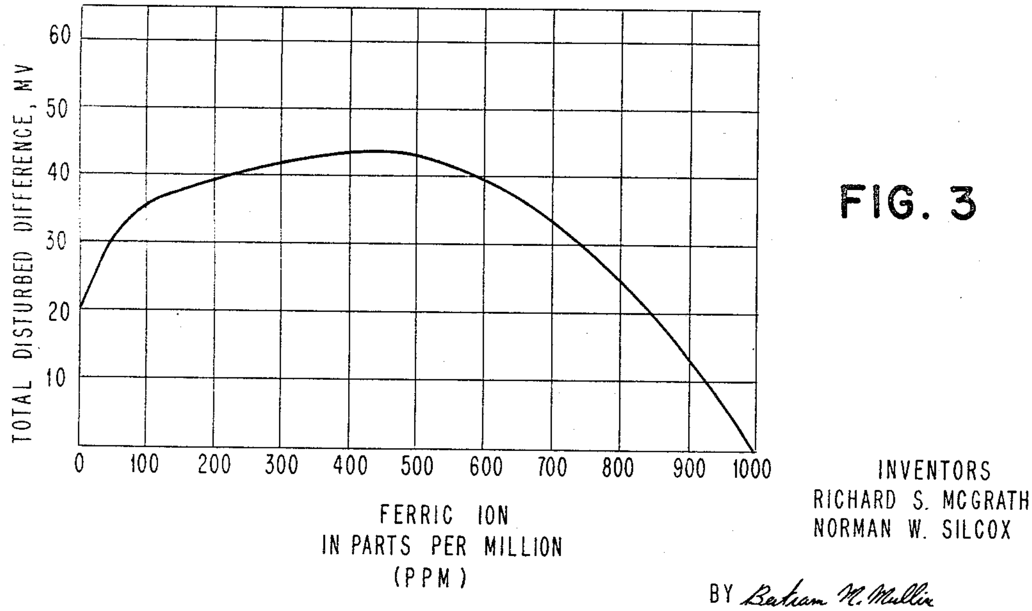
FIGURE 3 is a graphical representation of the effect of ferric ions in parts per million (p.p.m.) on signal output for a magnetic thin film storage device of the form shown in FIGURE 1.

As shown in FIGURE 3, the effect of the ferric ion, when selectively added, is most pronounced on the signal output of the storage device. FIGURE 3 indicates that with the addition of about 100 parts per million of ferric ion to the electroless deposition solution, the signal output is increased by about 15 millivolts. The signal output increases as the ferric ions are added and at about 500 parts per million of ferric ion, the signal output recognized is at a level of about 45 millivolts. As the concentration of ferric ions approaches 600 parts per million, optimum conditions are experienced. Although further addition of ferric ion beyond the 600 p.p.m. concentration is beneficial, in comparison to a solution lacking it, the advantages of ferric ions are not great beyond concentrations of 850 parts per million.

Figure 4:
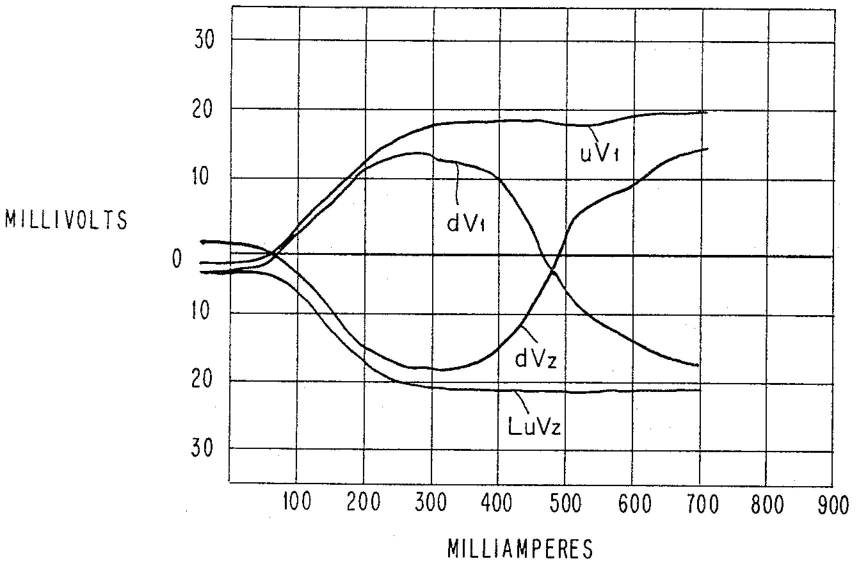
FIGURE 4 is a graphical representation in the form of S-curves of the magnetic characteristics of electrolessly deposited magnetic film without the addition of ferric ions in the electroless solution.
Figure 5:
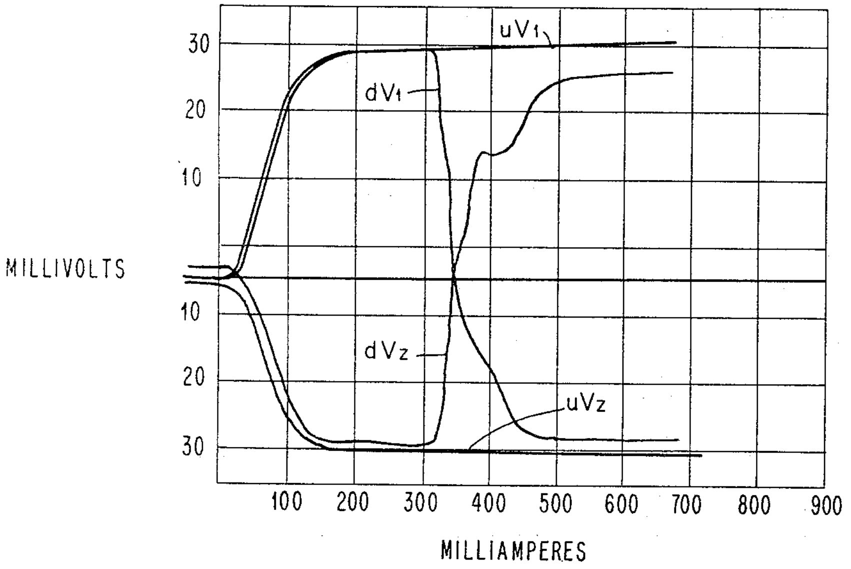
FIGURE 5 is a graphical representation in the form of S-curves illustrating the magnetic characteristics of an electrolessly deposited magnetic thin film in accordance with the invention.

To further illustrate the advantageous and beneficial effect of adding ferric ions to the electroless plating solution, reference is now made to FIGURES 4 and 5, which present S-curves for electrolessly deposited magnetic thin films. The S-curves of FIGURE 4 are obtained from an electrolessly deposited magnetic thin film prepared in a solution lacking the ferric ion addition, while the S-curves of FIGURE 5 are obtained from a magnetic thin film produced with the addition of the ferric ions. The S-curves are representative of the magnetic characteristics which are available with the magnetic thin films when utilized as a memory storage element.

These curves are obtained with a constant word pulse while varying the bit pulse. As described in the heretofore mentioned copending U.S. patent applications, the memory element of FIGURE 1 is switched, that is, the magnetic remanence switched from one stable state to the other by the application of longitudinal and transverse pulses. The longitudinal pulse, the word pulse, is applied along the longitudinal axis of the element, that is, along the direction indicated by arrow A, while the transverse pulse, the bit pulse, is applied along conductor 22 (shown for one element) through the aperture of the element. To write in the element, a unipolar word pulse of about 640 milliamperes in amplitude and 20 nanoseconds rise time is passed along the longitudinal axis of the element. A bit current with a time lag of about 55 nanoseconds is passed through conductor 22 going through the aperture of the element. The bit current has an amplitude increasing from zero to 600 milliamperes and a rise time of 30 nanoseconds. Reading is accomplished on the leading edge of the word pulse while writing is performed when the word pulse and bit pulse overlap. By maintaining the word pulse constant and varying the bit pulse over the ranges indicated in FIGURE 3, the waveform for the undisturbed one signal ($uV_1$) is obtained. To obtain the waveform for the disturbed one signal $dV_1$, the same procedure as for the undisturbed one signal $uV_1$ is followed, but, after the bit pulse is applied, the stored information is disturbed by applying from 500 to 1000 bit pulses of the appropriate polarity and of amplitude to 20% higher than the previous bit pulse with a rise time of 30 nanoseconds. The undisturbed zero $uV_z$ is obtained, as the undisturbed one $uV_1$, but the polarity of the bit pulse is reversed to that of the polarity for the undisturbed one $uV_1$. Similarly, the disturb zero $dV_z$ is obtained in a similar fashion to the disturbed one $dV_1$, with the polarities of the bit pulse being reversed as described for the undisturbed one $uV_1$.

These curves give an indication of the available one to zero difference signal for sensing intelligence in the operation of the memory element. What is desired, in such an S-curve, is that the disturbed one $dV_1$ and zero signals $dV_Z$ be large over a wide range of bit currents and, in particular, it is desired that the signals be large at low bit currents, that is, the curves rise fast from the origin. It is also desired that the curve of the disturbed one $dV_1$ be fairly close to the curve of the undisturbed one $uV_1$ signal and, similarly, that the disturbed zero $dV_Z$ curve be fairly close to the undisturbed zero $uV_Z$ curve. That is, it is desired that the distance $f$ between the undisturbed one $uV_1$ and disturbed one $dV_1$ and the distance $g$ between the undisturbed zero $uV_Z$ and disturbed zero $dV_Z$ signal be at a minimum. Further, it is desired that the cross-over point for the disturbed one $dV_1$ and disturbed zero $dV_Z$, that is, the point K where the disturb one $dV_1$ and disturb zero $dV_Z$ touch the abscissa of the graph, be maximized as far to the right from the origin as feasible. As these conditions are obtained with the S-curve, large zero and one signals are obtained, a wide range of bit currents including bit currents of low amplitude are available for switching the intelligence in the memory element, lowering the uniformity requirements for the elements in a large memory. Also, the intelligence in the memory element is not readily eliminated by accidentally applied stray fields or through the influence of adjacent fields. On the other hand, if these conditions are not met by the S-curve, that is, if the disturbed zero $dV_Z$ and disturbed one $dV_1$ signals are small, if they are not of approximately the same signal magnitude, if the range of bit current yielding large one and zero signals is narrow, or the cross-over point is not maximized to the right, the film yields a low signal on sensing and it requires very uniform memory elements with exactly the same range of usable bit currents. Further, the element has little resistance to the influence of stray fields.

Now, when the S-curves of FIGURE 4 are compared with the S-curves of FIGURE 5, several improvements are noted in the electroless solution containing the ferric ion in comparison to that lacking it: the leading edge of the waveforms representing the output signals rises faster thereby giving rise to a more rapid response. The disturb signal $dV_1$ and $dV_2$ waveforms more closely approximate the undisturbed signal waveforms $uV_1$ and $uV_2$ respectively. The close similarity between these waveforms indicates that the ferric ions enhance the resistance of the device to the influence of stray signals, thereby enlarging the storage capacity and increasing the device reliability.

The difference signal for the device of FIGURE 4 is between 30 to 50 millivolts over a range of bit currents of about 100 milliamperes; the difference signal for the device of FIGURE 5 is between 55 to 60 millivolts over the same range at a slightly lower cross-over point. These comparisons were made with elements such as those shown in FIGURE 1 which were of about 0.02 inch outer diameter, 0.015 inner diameter and had a thickness of about 0.0025 inch. The thickness of the electroless deposit was about 18,000 Angstroms and the composition of the magnetic films contained about 28% iron, 71.5% nickel and about 0.5% phosphorous.

To further show the effect of the ferric ion addition to the electroless solution, data is presented in Table III below which was obtained with the electroless solution of the previous example under the specified conditions. Various amounts of ferric ion were added in the form of the ferric ammonium sulfate in the concentrations given and the $dV_1$ signal measured.

TABLE III

| $Fe^{+++}$ (p.p.m.): | Signal (Mv.) |
|---|---|
| 20 | 28 |
| 50 | 31 |
| 100 | 36 |
| 150 | 37 |
| 200 | 39 |
| 400 | 43 |
| 500 | 43 |
| 600 | 38 |
| 800 | 25 |
| 1000 | No signal |

The nickel and ferrous ions are furnished to the solution in the form of any water soluble salts such as chlorides, sulfates, acetates, sulfanates and mixtures thereof as long as the anions do not interfere with the deposition. Similarly the hypophosphite ions are furnished in the form of water soluble salts of various bases such as sodium hypophosphite, potassium hypophosphite, hypophosphorus acid, and mixtures thereof.

The ferric ion is furnished in the form of ferric ammonium sulfate, ferric chloride, ferric sulfate, and ferric nitrate. Any water soluble iron salt is usable that yields ferric ions in solution, provided the salt is compatible with the ion species present.

Although it is preferred to use complexing and sequestering agents such as ammonia and sodium potassium tartrate, organic reagents which contain one or more of the following functional groups in concentrations that range from 5 grams/liter to 100 grams/liter and preferably at about 25 grams/liter: primary amino group ($—NH_2$), secondary amino group (>NH), tertiary amino group (>N—), imino group (=NH), carboxy group (—COOH), and hydroxy group (—OH). The preferred agents include Rochelle salt, Seignette salt, ammonia, ammonia hydroxide and ammonium chloride.

Similarly, various alkalizing agents may be added which include all the complexing agents heretofore listed, which in aqueous solution have a basic reaction and in addition all water soluble bases such as sodium potassium, and lithium hydroxide, and the like.

Surface active substances may be added such as sodium lauryl sulfate, as long as the substances do not interfere with the plating reaction. Exaltants also may be added to increase the rate of deposition by activating the hypophosphite anions such as succinic acid, adipic anions, alkali fluorides and other exaltants which are known to those in the art. Stabilizers may be added in minute concentrations such as 10 parts per billion. These may be stabilizers such as thiorea, sodium ethylxanthate, lead sulfate and the like. Also, pH regulators and buffers such as boric acid, disodium phosphate and others may be included in the solution.

Other metal ions may be added to the electroless solution in their lowest oxidation states, such as cobalt ($Co^{++}$), molybdenum ($Mo^{++}$), chromium ($Cr^{++}$), and the like. These cations increase the coercive force of the films and thereby increase the stability against disturb fields.

What has been described is a low disturb and high signal ferromagnetic film suitable for computer and data processing applications of 15 to 35 percent by weight iron, 65 to 85 percent by weight nickel, and 0.25 to 2 percent by weight phosphorous. These films are formed with either isotropic or anisotropic properties depending on whether a field is applied during the formation process. The film is the product of a chemical reduction process where hypophosphite is used. It will be recognized that other reducing agents such as hydrazine and borohydride and the like are capable of reducing nickel and iron in an electroless solution but the magnetic characteristics of these films are not as suitable for the intended application.

For ferromagnetic films of the present invention with the composition 15 to 35 percent by weight iron, 65 to 85 percent by weight nickel and 0.25 to 2 percent by weight phosphorous, the magnetic remanence ($B_r$) varies from about 0.05 to about 0.35 maxwells, the coercivity varies from about 2 to about 6 oersteds and the switching speed, that is, the time it takes for the magnetization to reverse its direction by 180° under an applied field of 20 oersteds, is from about 2 to 6 nanoseconds. With these properties, storage and switching elements are furnished for use in data processing and computer machines which exhibit characteristics heretofore not available in the industry.

While desirable magnetic characteristics are exhibited for memory and switching elements by ferromagnetic films containing 15 to 35 percent by weight iron, 65 to 85 percent by weight nickel, and 0.25 to 2 percent by weight phosphorous, greater signal differences are available with ferromagnetic films containing 24 to 35 percent by weight iron, 65 to 76 percent by weight nickel, and 0.25 to 2 percent by weight phosphorous. The optimum characteristics for use in data processing and computer machines are obtained with a ferromagnetic film that contains 28 to 30 percent by weight iron, 70 to 72 percent by weight nickel, and 0.25 to 2 percent by weight phosphorous. These ferromagnetic films provide magnetic characteristics heretofore not available in the art.

While the invention has been particularly shown and described with reference to preferred embodiments thereof, it will be understood by those skilled in the art that various changes in form and details may be made therein without departing from the spirit and scope of the invention.

What is claimed is:

1. An aqueous solution for electrolessly plating a magnetic material comprising:
   water soluble nickel and iron salts in concentrations sufficient to provide a nickel to ferrous ion ratio in the range between 1 to 5, and an amount of ferric ions, up to 850 parts per million, sufficient to enhance the characteristics of said magnetic material;
   an amount of hypophosphite ions up to 7.00 grams/liter sufficient to reduce said nickel and ferrous ions; and
   sufficient hydroxyl ions to maintain the pH at at least 8.

2. An aqueous solution for electrolessly plating a magnetic material comprising:
   water soluble salts of nickel and iron in concentrations sufficient to provide a nickel to ferrous ion ratio in the range between 1 to 5, and an amount of ferric ions, up to 850 parts per million, sufficient to enhance the characteristics of said magnetic material;
   hypophosphite ions in a concentration in the range between 2.0 to 7.0 grams/liter;
   a metal complexing agent capable of forming a stable water soluble complex with nickel and iron selected from the group consisting of ammonia and organic complex-forming compounds having at least one functional group selected from the group consisting of amino, imino, carboxy and hydroxy radicals in concentrations ranging from 5 to 100 grams/liter; and,
   sufficient hydroxyl ions in concentrations to maintain the pH at at least 8.

3. An aqueous solution for electrolessly plating a magnetic material comprising:
   water soluble salts of nickel and iron in concentrations sufficient to provide a nickel to ferrous ion ratio in the range between 1 to 5 where the nickel ions are in concentrations ranging from between 0.3 to 30 grams/liter, the ferrous ions are in concentrations in the range between 0.1 to 10 grams/liter, and the ferric ions are in concentrations in the range between 200 to 850 parts per million;
   hypophosphite ions in a concentration in the range between 2.0 to 7.0 grams/liter;
   tartrate ions in a concentration in the range between 5 to 80 grams/liter;
   sufficient ammonium ions to form the nickel hexamine complex ion in the solution; and,
   sufficient hydroxyl ions in concentrations to maintain the pH at at least 8.

4. An aqueous solution for electrolessly plating a magnetic material comprising:
   water soluble salts of nickel and iron in concentrations sufficient to provide a nickel to ferrous ion ratio of about 3 to 1 where the nickel ions are in concentrations ranging from between 0.3 to 30 grams/liter, the ferrous ions are in concentrations in the range between 0.1 to 10 grams/liter, and the ferric ions are in concentrations in the range between 200 to 850 parts per million;
   hypophosphite ions in a concentration of about 3.5 grams/liter;
   sufficient ammonium ions to form the nickel hexamine complex ion in solution; and,
   sufficient hydroxyl ions in concentrations to maintain the pH at at least 10.5.

5. A process for electrolessly depositing a magnetic material on a substrate by the step of:
   immersing said substrate into a solution containing water soluble salts of nickel and iron in sufficient concentrations to provide a nickel to ferrous ion ratio in the range between 1 to 5, an amount of ferric ions, up to 850 parts per million, sufficient to enhance the characteristics of said magnetic material;
   an amount of hypophosphite ions up to 7.00 grams/ liter sufficient to reduce said nickel and ferrous ions; and sufficient hydroxyl ions in concentrations to maintain the pH at at least 8.

6. A process for electrolessly plating a magnetic material on a substrate by the steps of:

immersing said substrate in a solution containing water soluble salts of nickel and iron in concentrations sufficient to provide a nickel to ferrous ion ratio in the range between 1 to 5, a ferric ion concentration in the range between 200 to 850 parts per million, hypophosphite ions in a concentration in the range between 2.0 to 7.00 grams/liter, metal complexing agents capable of forming a water soluble complex with nickel and iron selected from the group consisting of ammonia and organic complex-forming compounds having at least one functional group selected from the group consisting of amino, imino, carboxy and hydroxy radicals in concentrations ranging from 5 to 100 grams/liter, and, maintaining the pH of said solution at at least 8 to permit the deposition of the magnetic material on the substrate.

7. A process for electrolessly depositing a magnetic material on a substrate by the steps of:

immersing said substrate in an aqueous solution containing water soluble salts of nickel and iron in concentrations sufficient to provide a nickel to ferrous ion ratio in the range between 1 to 5, a ferric ion concentration in the range between 200 to 850 parts per million, hypophosphite ions in a concentration in the range between 2 to 7.0 grams/liter; tartrate ions in a concentration in the range between 5 to 80 grams/liter, sufficient ammonium ions to form the nickel hexamine complex ion in the solution, and, maintaining the pH of said solution at at least 8 to permit the deposition of a nickel-iron phosphorous alloy on the surface of the substrate.

8. A process for electrolessly depositing a magnetic material on a substrate by the steps of:

immersing said substrate in an aqueous solution containing water soluble salts of nickel and iron in concentrations sufficient to provide a nickel to ferrous ion ratio of about 3 to 1; a ferric ion concentration of about 500 parts per million; hypophosphite ions in a concentration of about 3.5 grams/liter; sufficient ammonium ions to form the nickel hexamine complex ion in the solution; and, maintaining the pH of said solution at about 10.5 to permit the deposition of a nickel-iron phosphorous alloy on the surface of the substrate.

9. A process for electrolessly depositing a nickel-iron-phosphorous film on an electrically conductive substrate where the composition of said film ranges from between 15 to 35 percent iron, 65 to 85 percent nickel, and 0.25 to 2 percent by weight phosphorous, said process comprising the steps of:

immersing said electrical conductive substrate in an aqueous solution containing water soluble salts of nickel and iron in concentrations sufficient to provide a nickel to ferrous ion ratio in the range between 1 to 5, ferric ions in the concentration from about 200 to 850 parts per million, hypophosphite ions in a concentration in the range between 2 to 7.0 grams/liter, tartrate ions in a concentration in the range between 5 to 80 grams/liter, and sufficient ammonium ions to form the nickel hexamine complex ion in the solution;

maintaining the pH of said bath at at least 8; and maintaining the rate of deposition in the range between 150 A. per minute to 1500 A. per minute.

10. A process for electrolessly depositing a nickel-iron-phosphorous film on an electrically conductive substrate where the composition of said film ranges from between 15 to 35 percent iron, 65 to 85 percent nickel, and 0.25 to 2 percent by weight phosphorous, said process comprising the steps of:

immersing said electrical conductive substrate in an aqueous solution containing water soluble salts of nickel and iron in concentrations sufficient to provide a nickel to ferrous ion ratio in the range between 3 to 1, a ferric ion concentration of about 500 parts per million, hypophosphite ions in a concentration in the range between 2 to 7.0 grams/liter, tartrate ions in a concentration in the range between 5 to 80 grams/liter, and sufficient ammonium ions to form the nickel hexamine complex ion in the solution;

maintaining the pH of said bath at at least 10.5; and maintaining the rate of deposition in the range between 150 A. per minute to 1500 A. per minute.

11. A process for electrolessly depositing a nickel-iron-phosphorous film on an electrically conductive substrate where the composition of said film ranges from between 15 to 35 percent iron, 65 to 85 percent nickel, and 0.25 to 2 percent by weight phosphorous, said process comprising the steps of:

immersing said electrical conductive substrate in an aqueous solution containing water soluble salts of nickel and iron in concentrations sufficient to provide a nickel to ferrous ion ratio in the range between 3 to 1, a ferric ion concentration of about 500 parts per million, hypophosphite ions in a concentration of about 3.5 grams/liter, tartrate ions in a concentration of about 17.5 grams/liter, and sufficient ammonium ions to form the nickel hexamine complex ion in the solution;

maintaining the pH of said bath at at least 10.5; and, maintaining the rate of deposition in the range between 150 A. per minute to 1500 A. per minute.

References Cited

UNITED STATES PATENTS

| | | | |
|---|---|---|---|
| 2,827,399 | 3/1958 | Eisenberg | 106—1 X |
| 3,234,031 | 2/1966 | Zirngiebl et al. | 106—1 |
| 3,255,033 | 6/1966 | Schmeckenbecher | 106—1 X |
| 3,265,511 | 8/1966 | Sallo | 106—1 |
| 3,268,353 | 8/1966 | Melillo | 117—130 |
| 3,282,723 | 11/1966 | Melillo | 117—130 |

ALEXANDER H. BRODMERKEL, *Primary Examiner.*

L. HAYES, *Assistant Examiner.*